US006609582B1

(12) United States Patent
Botti et al.

(10) Patent No.: US 6,609,582 B1
(45) Date of Patent: Aug. 26, 2003

(54) POWER GENERATION SYSTEM AND METHOD

(75) Inventors: Jean Joseph Botti, Rochester Hills, MI (US); Malcolm James Grieve, Fairport, NY (US); Carl Elmer Miller, Millington, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/294,679

(22) Filed: Apr. 19, 1999

(51) Int. Cl.[7] ............................... B60K 1/00
(52) U.S. Cl. ............ 180/65.3; 180/309; 180/65.2
(58) Field of Search ............... 180/65.1, 65.2, 180/65.3, 65.4, 309; 429/13, 22; 60/595, 596, 605.2, 276; 290/4 R, 4 C

(56) References Cited

U.S. PATENT DOCUMENTS

| | | | | |
|---|---|---|---|---|
| 4,481,772 A | * | 11/1984 | Benaroya | 60/595 |
| 5,339,634 A | * | 8/1994 | Gale et al. | 60/723 |
| 5,413,879 A | | 5/1995 | Domeracki et al. | |
| 5,482,791 A | | 1/1996 | Shingai et al. | |
| 5,541,014 A | * | 7/1996 | Micheli et al. | 429/19 |
| 5,678,647 A | | 10/1997 | Wolfe et al. | |
| 5,727,385 A | * | 3/1998 | Hepburn | 423/213.7 |
| 5,811,201 A | * | 9/1998 | Skowronski | 204/269 |
| 5,832,880 A | * | 11/1998 | Dickey | 123/25 C |
| 5,867,982 A | * | 2/1999 | Tengblad et al. | 123/198 F |
| 5,968,680 A | * | 10/1999 | Wolfe et al. | 429/13 |
| 6,138,454 A | * | 10/2000 | Fournier et al. | 60/286 |
| 6,213,234 B1 | * | 4/2001 | Rosen et al. | 180/65.3 |
| 6,230,494 B1 | * | 5/2001 | Botti et al. | 60/649 |
| 6,260,520 B1 | * | 7/2001 | Van Reatherford | 123/48 A |
| 6,286,482 B1 | * | 9/2001 | Flynn et al. | 123/435 |

* cited by examiner

*Primary Examiner*—Kenneth R. Rice
*Assistant Examiner*—James S. McClellan
(74) *Attorney, Agent, or Firm*—Vincent A. Cichosz

(57) ABSTRACT

A power generation system providing an engine configured to produce hydrogen rich reformate to feed a solid oxide fuel cell includes an engine having an intake and an exhaust; an air supply in fluid communication with the engine intake; a fuel supply in fluid communication with the engine intake; at least one SOFC having an air intake in fluid communication with an air supply, a fuel intake in fluid communication with the of, engine exhaust, a SOFC effluent and an air effluent. Engines include a free piston gas generator with rich homogenous charge compression, a rich internal combustion engine cylinder system with an oxygen generator, and a rich inlet turbo-generator system with exhaust heat recover. Oxygen enrichment devices to enhance production of hydrogen rich engine exhaust include pressure swing absorption with oxygen selective materials, and oxygen separators such as an SOFC oxygen separator and a ceramic membrane oxygen separator.

95 Claims, 2 Drawing Sheets

POWER GENERATION SYSTEM AND METHOD

TECHNICAL FIELD

The present invention relates to a power generation system and method, and especially relates to a hybrid electric powertrain having an engine configured to produce reformate to feed a solid oxide fuel cell.

BACKGROUND OF THE INVENTION

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and $CO_2$ emission improvements (reformulated gasoline, alcohols, LPG, etc.) and to significant toxic and $CO_2$ emission improvements (natural gas, DME, etc.). Hydrogen is clearly the ultimate environmental fuel, with potential as a nearly emission free internal combustion engine fuel (including $CO_2$ if it comes from a non-fossil source). Unfortunately, the market-based economics of alternative fuels or new power train systems are uncertain in the short to mid-term.

The automotive industry has made very significant progress in reducing automotive emissions for both the mandated test procedures and the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

What is needed in the art is a power generation system having essentially zero emissions, high efficiency, and compatibility with existing fuels and infrastructure.

SUMMARY OF THE INVENTION

The present system and method relate to an engine configured and operated to produce a hydrogen rich engine exhaust and to oxygen enrichment devices to further optimize production of hydrogen rich engine exhaust. The present hydrogen rich exhaust engines include a free piston gas generator with rich homogenous charge compression ignition, an oxygen generator and rich internal combustion engine cylinder system, and a rich inlet turbo-generator system with exhaust heat recovery. Oxygen enrichment devices include pressure swing absorption (PSA) with oxygen selective materials, oxygen separators such as an SOFC oxygen separator and an oxygen separator utilizing a ceramic membrane and differential pressure to drive oxygen across the membrane.

The present invention further relates to a power generation system and method employing the present hydrogen rich exhaust engines and oxygen enrichment devices, and especially relates to a hybrid electric powertrain having an engine configured to produce reformate to feed a solid oxide fuel cell. The power generation system comprises an engine having an intake and an exhaust, wherein said engine is configured to produce a hydrogen rich engine exhaust; an air supply in fluid communication with said engine intake; a fuel supply in fluid communication with said engine intake; at least one SOFC having an air intake in fluid communication with an air supply, a fuel intake in fluid communication with said engine exhaust, a SOFC effluent and an air effluent.

The method comprises supplying at least a first portion of fuel and a first portion of air to an engine, wherein said engine is configured to produce a rich engine exhaust; reacting said first portion of fuel and said first portion of air in said engine to produce a hydrogen rich engine exhaust; introducing said hydrogen rich engine exhaust to a fuel intake of a SOFC; introducing a second portion of air to an air intake of said SOFC; and ionizing oxygen in the second portion of air such that the ionized oxygen migrates to the fuel side of the SOFC where it reacts with said hydrogen rich engine exhaust to produce a SOFC effluent.

These and other features and advantages of the present invention will be apparent from the following brief description of the drawings, detailed description, and appended claims and drawings.

BRIEF DESCRIPTION OF THE DRAWINGS

Referring now to the drawings, which are meant to be exemplary, not limiting, and where mass flows are shown with solid lines and power flows are illustrated with broken lines.

DETAILED DESCRIPTION OF THE INVENTION

Figure 1:
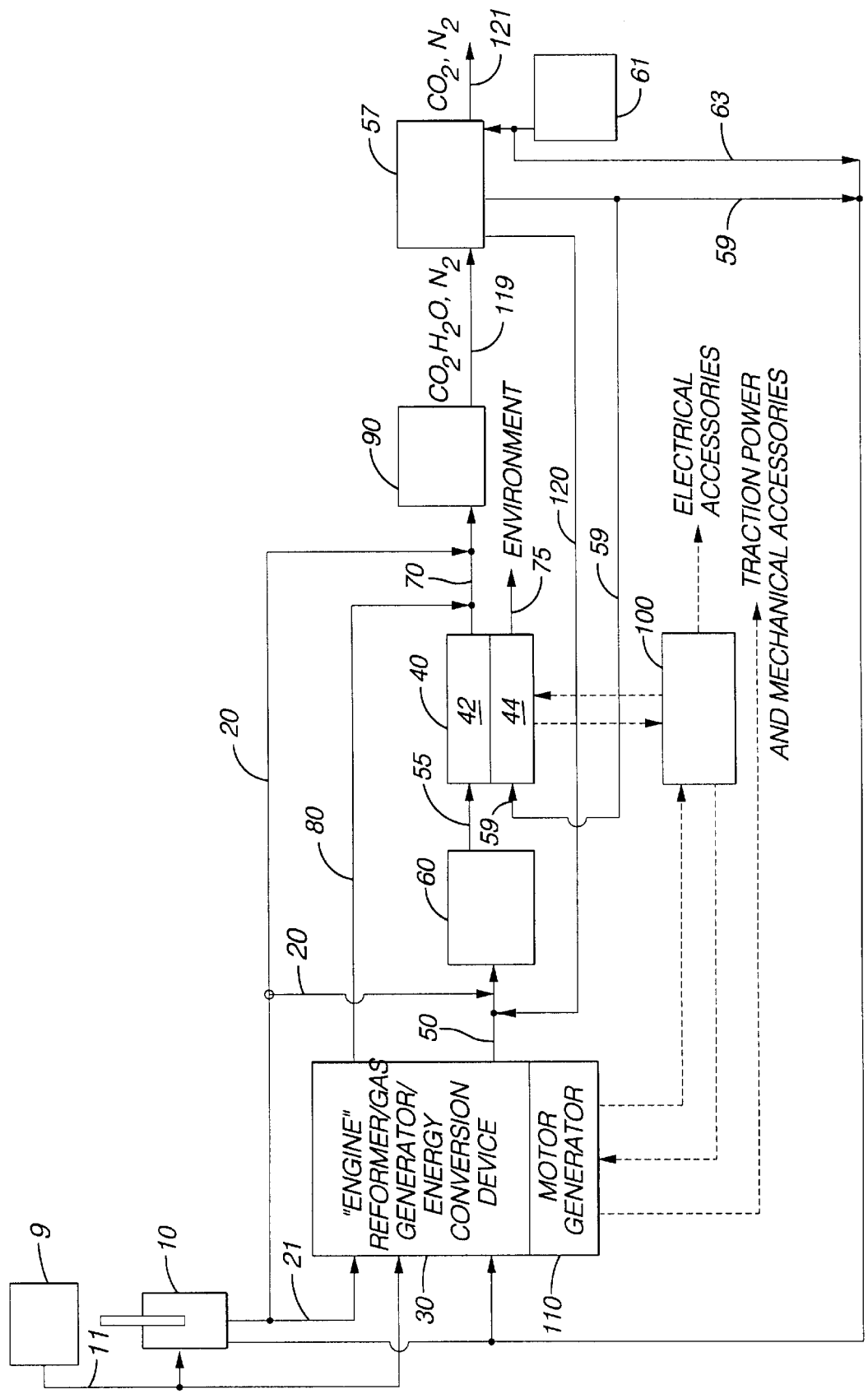
FIG. 1 is a schematic depiction of an embodiment of a hybrid electric power train system of the present invention utilizing a SOFC on the exhaust side of an engine with the engine configured to produce hydrogen rich exhaust to feed the SOFC.

The present system and method relate to an engine configured and operated to produce a hydrogen rich engine exhaust and to oxygen enrichment devices to further optimize production of hydrogen rich engine exhaust. The present hydrogen rich exhaust engines include, but are not limited to, a free piston gas generator with rich homogenous charge compression ignition, an oxygen generator and rich internal combustion engine cylinder system, and a rich inlet turbo-generator system with exhaust heat recovery. Oxygen enrichment devices include, but are not limited to, pressure swing absorption (PSA) with oxygen selective materials, oxygen separators such as an SOFC oxygen separator and an oxygen separator utilizing a ceramic membrane and differential pressure to drive oxygen across the membrane.

The present invention further relates to a power generation system and method employing the present hydrogen rich exhaust engines and oxygen enrichment devices, and especially relates to a hybrid electric powertrain having an engine configured to produce reformate to feed a solid oxide fuel cell.

While the remaining discussion herein focuses on embodiments wherein the present hydrogen rich exhaust and oxygen enrichment devices are employed to feed a SOFC, the present invention is not limited thereto. When used in non-SOFC energy conversion devices, the hydrogen rich exhaust is particularly valuable for the advantage of controlling emissions. The present hydrogen rich exhaust engine configurations and oxygen enrichment devices may be utilized to feed energy conversion devices such as additional SOFCs and/or other fuel cells, gas turbines, spark ignited engines, or compression ignited engines.

The present hydrogen rich exhaust and oxygen enrichment devices will now be described in detail in an embodiment comprising a hybrid electric powertrain having an engine configured to produce a hydrogen rich engine exhaust to feed a solid oxide fuel cell (SOFC). The method and system are designed and optimized for extremely rich engine operation to produce the hydrogen rich engine exhaust. The system comprises an engine configured to produce a hydrogen rich engine exhaust for feeding a SOFC, said engine having an intake and an exhaust; an air supply in fluid communication with said engine intake; a fuel supply in fluid communication with said engine intake; and at least one solid oxide fuel cell (SOFC), having an air intake in fluid communication with an air supply, a fuel side intake, a SOFC effluent and an air effluent, said SOFC fuel side intake in fluid communication with said hydrogen rich engine exhaust.

The method comprises supplying at least a first portion of fuel and a first portion of air to an engine; reacting said first portion of fuel and said first portion of air in an engine to produce a hydrogen rich engine effluent; introducing said hydrogen rich engine effluent to a fuel intake of a SOFC; introducing a second portion of air to an air intake of said SOFC; and ionizing oxygen in the second portion of air such that the ionized oxygen migrates to the fuel side of the SOFC where it reacts with said hydrogen rich engine effluent to produce an SOFC effluent.

Generally, the system may comprise at least one solid oxide fuel cell ("SOFC"), an engine configured to produce a hydrogen rich engine exhaust, one or more heat exchangers, and optionally, one or more compressors, an exhaust turbine, a catalytic converter, preheating device, fast start-up reformer including, but not limited to, a plasmatron, rich burner, or catalytic reformer, electrical source, and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, etc.

The present power generation system and method provides a hydrogen rich engine exhaust for feeding a SOFC provided on the exhaust side of an engine. The concept of providing a SOFC on the exhaust side of an engine is further defined in commonly assigned U.S. patent application Ser. No. 09/241239, which is hereby incorporated herein by reference. Commonly assigned U.S. patent application Ser. No. 09/241171, hereby incorporated herein by reference, further defines the use of a SOFC in various hybrid powertrain embodiments which allow the engine and SOFC to operate individually or concurrently.

The present power generation system and method provide the advantages of increasing the hydrogen content of the engine exhaust which feeds the SOFC, thereby increasing the power density of a given SOFC, enhancing the systems ability to drive an efficient and/or compact SOFC. Hydrogen is known to be the ideal fuel for operating a SOFC. The present system and method increases the hydrogen content of the engine exhaust, thus allowing a much smaller SOFC to provide an amount of power previously only achieved with a larger SOFC.

Further, the present powertrain configuration contemplates an exhaust position that allows the advantage of gradual heating of the SOFC with waste heat, obviating the need for additional energy consumption to heat the SOFC. Additionally, the exhaust configuration allows the exhaust catalyst to remain hot when the engine is off, enabling the engine to cycle on and off with minimal emissions. The SOFC provides the base load and batteries handle the low speed transients.

A further advantage of the present system and method is that it extracts useful work for traction and accessory loads, thus minimizing reforming losses.

The present system and method is particularly well suited to a hybrid electric powertrain system, although it can also be used in conjunction with a small battery and still achieve low emissions.

A water shift catalyst may be employed to effect water recovery and increase hydrogen yield. The water shift catalyst may be employed alone or in combination with an additional catalyst for removing carbonaceous particulate emissions.

Referring now to the Figures, FIG. 1 discloses an embodiment of the present hybrid electric power train with an engine configured to produce hydrogen rich engine exhaust (reformate) to feed at least one SOFC in exhaust receiving communication with the hydrogen rich engine exhaust. On cold start, the fast start-up reformer 10 is operated with fuel 11 from fuel supply 9 and air 63 from air supply 61 to allow operation of engine 30 with production of reformer exhaust 20. Fuel supply 9 also feeds engine 30 when the engine is not run with reformate 21. Use of such a plasmatron or other "instant-on" start-up reformer allows zero emission vehicle operation with engine and battery while the SOFC (or, optionally, plurality of SOFCs) warms up to operational temperatures, operational temperatures typically being about 600° C. to about 900° C. During start up conditions, the engine 30 is run with reformate 21 and air 63 such as from air supply 61, using an optional electrical motor/generator 110, while the SOFC 40 is heated slowly in the engine exhaust. SOFC 40 may be powered with reformer exhaust 20 or with rich exhaust from the engine. The engine exhaust position is such that it allows gradual heating of the SOFC 40 with waste heat. Exhaust catalyst 90 can be heated more aggressively with hot exhaust, additional air, or fuel (not shown), or reformate 20. During start up conditions, engine 30 and electrical source 100 (including, but not limited to, a power battery, lithium polymer, or other electrical source) have enough power to operate the vehicle. When the exhaust catalyst 90 is hot, fast start-up reformer 10 may be turned off.

Upon reaching operating temperature, SOFC 40 operates the base load of electrical accessories and traction power accessories and recharges electrical source 100, while the engine 30 now functions as a rich gas generator wherein it provides limited traction power. In situations where high power is required, engine 30 can switch to stoichiometric fueling for peak power. In this situation, electrical source 100 can provide additional power. The embodiment shown in FIG. 1 shows motor generator 110 in an arrangement that is typical of an integrated parallel hybrid. This allows electric power to be added or removed from the shaft. The present invention contemplates utilization of other parallel or series configurations. The present invention also contemplates utilization of non-hybrid configurations.

In low power modes, engine 30 may be turned off altogether. SOFC 40 and batteries, such as electrical source 100, supply all the traction and accessory power when engine 30 is turned off. The present system and method provide the advantage that when the engine is off (low power mode powertrain operation), the exhaust catalyst 90 is kept hot.

When higher power is required, engine 30 can cycle on for short bursts with minimal emissions because exhaust catalyst 90 is kept hot. Alternatively, if the engine is cold, fast start-up reformer 10, such as a plasmatron, can be used for high power minimal emission operation.

The present system and method optimizes (increases) the hydrogen content of the engine exhaust, which allows utilization of a much smaller SOFC than previously available for equivalent power.

In addition, the hydrogen content of the exhaust driving the SOFC may be further increased using water recovery and a water shift catalyst in water shift device 60. The water shift catalyst is readily selected from water shift catalysts known in the art. Exhaust catalyst effluent 119 containing recovered water, passes through heat exchanger 57 positioned downstream of exhaust catalyst 90. Heat exchanger 57 condenses water out of exhaust catalyst effluent 119, cooling exhaust catalyst effluent 119 and heating intake air 63 from air supply 61. Water from recovered stream 120 react in the presence of the water shift catalyst in water shift device 60 to produce carbon dioxide and hydrogen, according to known reaction mechanisms. Optionally, a mixing device (not shown) may be provided to mix recovered stream 120 and hydrogen rich engine exhaust 50 prior to feeding water shift device 60.

The SOFC is operated using hydrogen rich fuel in the form of water shift effluent 55, or hydrogen rich fuel in the form of hydrogen rich engine exhaust 50 to feed the fuel side 42 of SOFC 40. Air side 44 may be fed with an air supply 59 from a preheated air source such as heat exchanger 57. SOFC effluent 70 then feeds exhaust catalyst 90 while oxygen depleted air stream 75 is released from air side 44 of SOFC 40. Oxygen depleted air stream 75 may be fed to exhaust catalyst 90 or used to feed dilute cylinders, such as cylinders 314 and 316 in FIG. 3 (connections not shown).

Figure 2:
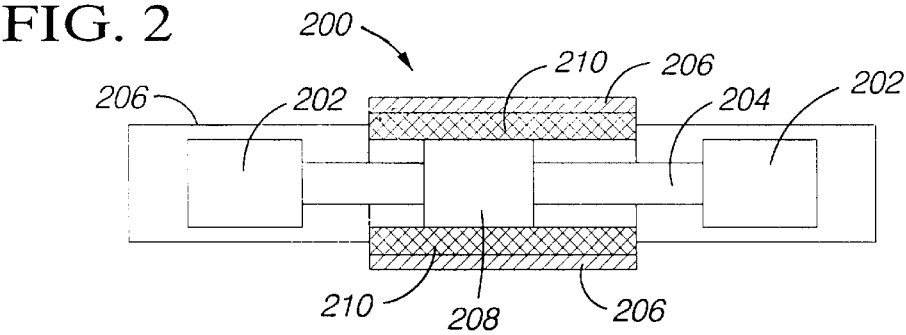
FIG. 2 is a schematic depiction of an embodiment utilizing a free piston gas generator with super rich homogenous charge compression ignition to provide a hydrogen rich engine exhaust to feed the SOFC.
Figure 3:
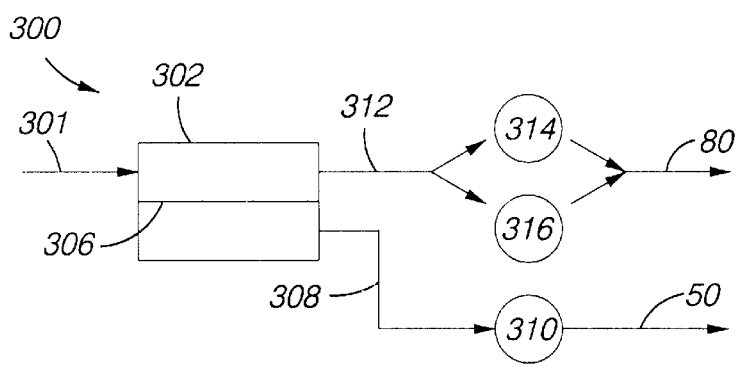
FIG. 3 is a schematic depiction of an embodiment utilizing an oxygen generator and a rich internal combustion engine cylinder system to provide a hydrogen rich engine exhaust to feed the SOFC.
Figure 4:
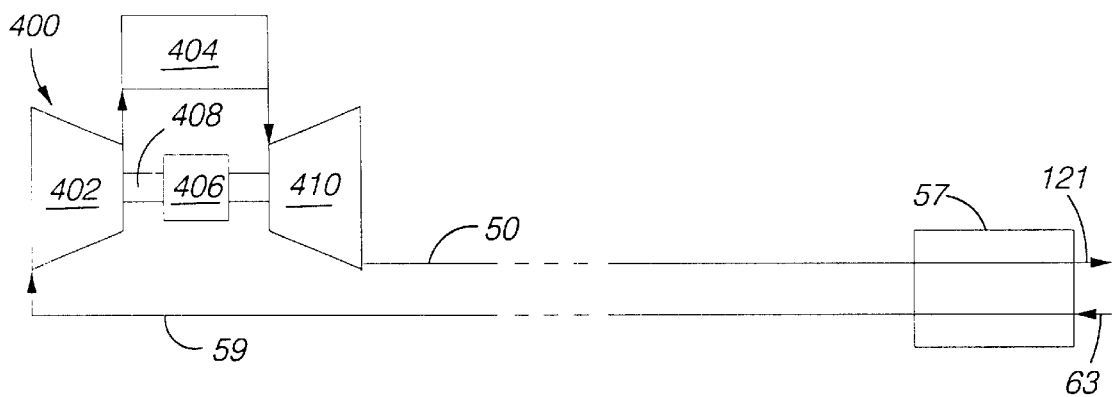
FIG. 4 is a schematic depiction of an embodiment utilizing an extremely rich inlet turbo-generator system with exhaust heat recovery to provide a hydrogen rich engine exhaust to feed the SOFC.

FIGS. 2, 3, and 4 show three embodiments for configuring the present system with an engine 30 operated as an optimized hydrogen rich fuel producer for SOFC 40.

FIG. 2 shows an embodiment utilizing a free piston gas generator 200, wherein power is removed electrically through a linear alternator, with super rich homogenous charge compression ignition (HCCI) to provide a hydrogen rich exhaust. Free piston gas generators have been described in the literature, such as in SAE Paper No. 98FL-486 by Van Blarigan et al. entitled "Homogeneous Charge Compression Ignition with a Free Piston: A New Approach to Ideal Otto Cycle Performace" which is herein incorporated by reference. FIG. 2 shows the basic construction of a free piston gas generator 200 comprising pistons 202 connected via connecting rod 204 enclosed in cylinder casing 206, which forms the cylinder in which the pistons ride. Permanent magnet assembly 208 resides within cylinder casing 206 between linear alternator windings 210. Connecting rod 204 links the pistons 202 and permanent magnet assembly 208 into one solid unit. A novel approach to HCCI which forms part of this invention is the use of HCCI to enable extremely rich combustion. Super rich HCCI engines run at unusually rich equivalence ratios to generate very high hydrogen yield. In the present system and method, this type of engine can be started lean for low emissions and then transitioned to super rich combustion when the SOFC is ready. Free piston gas generator 200 can be utilized as a compact, low friction engine for the present hybrid electric powertrains. If desired, other conventional crankshaft based engines may be utilized, with such features as high compression ratio, high intake temperature, supercharged or high exhaust gas recirculation, which features serve to enable HCCI.

In another embodiment of the present system and method, engine 30 serves as an oxygen generator and oxygen enrichment is utilized to allow fast combustion with very rich equivalence ratios.

FIG. 3 shows an embodiment utilizing an oxygen generator and rich internal combustion engine cylinder system 300 to provide a hydrogen rich engine exhaust. This embodiment contemplates utilizing a rich internal combustion engine cylinder system 300 with enhanced rich combustion in all or at least part of the engine. In this embodiment, use of HCCI is optional. In the embodiment shown in FIG. 3, an air source (not shown) supplies air 301 to oxygen separator 302 having oxygen diffusion membrane 306. Oxygen diffuses across oxygen diffusion membrane 306 providing oxygen rich stream 308 to feed rich cylinder 310, producing hydrogen rich engine exhaust 50. Use of the oxygen rich stream 308 in rich cylinder 310 provides the significant advantage of obviating $N_2$ dilution of the rich engine exhaust 50. This results in increased SOFC efficiency and power. Nitrogen enriched by-product stream 312 (i.e., oxygen depleted air) can be used to run non-rich cylinders, such as cylinders 314 and 316, with high efficiency and low emissions, producing dilute engine exhaust 80. $N_2$ is thermo-dynamically preferred as a diluent, providing lean burn efficiency with stoichiometric fueling. This embodiment, then, provides the advantage of enabling production of hydrogen rich exhaust 50 with essentially no nitrogen. It further enables oxygen rich combustion without soot by using high temperature combustion. Additionally, rather than being lost as waste, by-product stream 312 is utilized in the engine to run non-rich cylinders 314 and 316.

FIG. 4 shows an embodiment utilizing an extremely rich, preheated inlet turbo-generator system 400 having high speed generator 406 to provide a hydrogen rich exhaust. Preheated air may be provided utilizing a heat exchanger disposed downstream of the exhaust catalyst 90 (shown in FIG. 1). For example, heat exchanger (water condenser) 57, shown in FIG. 1, may be used. Preheated air 59, which may be provided, for example, by heat exchanger 57 (shown in FIG. 1), is compressed in compressor 402 and fed into rich combustor 404, where it reacts to power high speed turbo-generator 406 having shaft 408 and turbine 410, producing hydrogen rich exhaust 50. This embodiment contemplates a super rich turbo-generator that can be run at high power density near stoichiometric fueling conditions or at low power gas generating mode when run rich with preheated air. A significant advantage is provided in that turbo-generators can be oil free, enhancing SOFC robustness.

Figure 5:
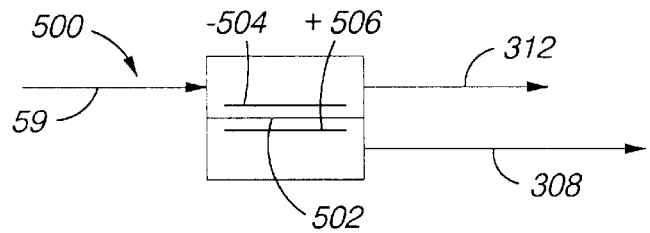
FIG. 5 is a schematic depiction of an embodiment of an oxygen enrichment device comprising an SOFC oxygen separator that utilizes reverse electric potential to pump oxygen across a ceramic electrolyte to produce an oxygen rich stream to enhance rich combustion in all or part of an engine.
Figure 6:
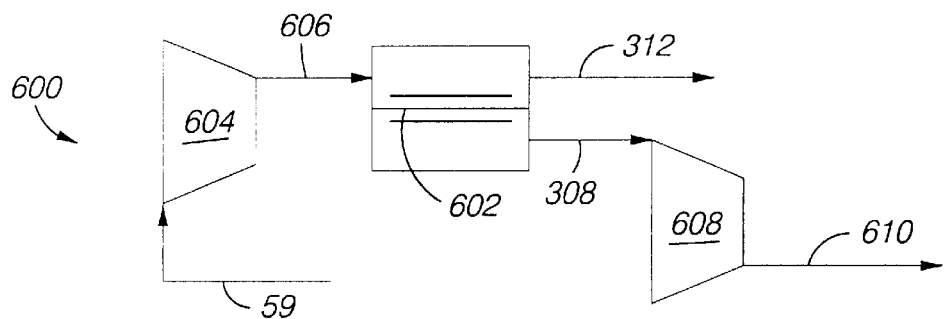
FIG. 6 is a schematic depiction of an embodiment of an oxygen enrichment device comprising an oxygen separator utilizing a ceramic membrane, for example with mixed conductor electrolyte, and differential pressure to drive the oxygen across the membrane.

In additional embodiments, oxygen enrichment devices are employed to enhance the production of hydrogen rich exhaust 50. Oxygen enrichment may be utilized in conjunction with any of the hydrogen enriched exhaust configurations. However, oxygen enrichment is particularly preferred for use with the rich cylinder embodiment of FIG. 3 where conventional combustion otherwise limits the degree to which super rich operation is possible. FIGS. 5 and 6 show embodiments in which oxygen enrichment devices are utilized.

Oxygen enrichment may be effected utilizing pressure swing absorption techniques (PSA) with oxygen selective materials. PSA employs an absorbent bed that preferentially absorbs oxygen or nitrogen. With PSA, the absorbent bed is subjected to pressure cycles that cause enriched and depleted streams to be drawn out of the system.

FIG. 5 shows oxygen separator 500 comprising a membrane 502 disposed between positive electrode 506 and negative electrode 504. Preheated air stream 59 enters oxygen separator 500 and reverse electric potential is used to pump oxygen ions across a ceramic electrolyte provided on membrane 502. Produced oxygen depleted stream 312 can be used, for example, to feed non-rich cylinders 314 and 316 (shown in FIG. 3) while oxygen rich steam 308 is used to feed an engine, such as rich cylinder 310 (shown in FIG. 3) in a rich cylinder system.

FIG. 6 shows an embodiment of an oxygen separator 600 utilizing a ceramic membrane, for example with mixed conductor electrolyte. In FIG. 6, preheated air 59 passes through compressor 604. Compressed air 606 enters oxygen separator 600 having ceramic membrane 602 with mixed conductor electrolyte. Oxygen ions and electrons are conducted across the ceramic membrane in opposite directions. Pressure may be applied to one side of the membrane, or, alternatively, vacuum may be applied to the opposite side of the membrane, to force oxygen through the membrane. Alternatively, a combination of pressure and vacuum may be employed. Oxygen rich stream 308 and oxygen depleted stream (i.e., nitrogen rich stream) 312 are produced. Produced oxygen rich stream 308 may optionally be passed through compressor 608 to form compressed oxygen stream 610. Compressed oxygen stream 610 may then be used to feed an engine, producing hydrogen rich exhaust 50 in accordance with the present invention.

While the foregoing oxygen separation techniques are preferred, other oxygen separation techniques may be utilized and are within the scope of the present invention.

Within an engine, fuel is burned in the presence of air. As disclosed herein, the present system and method is configured and optimized to produce a super rich engine exhaust high in $H_2$ and CO to drive an efficient and/or compact SOFC. The engine is operated rich to enable this production. A typical combustion engine cannot produce more than about 15% by volume combined concentration of hydrogen and carbon monoxide exhaust. In theory, production of 100% hydrogen is possible. However, in order to increase hydrogen enrichment and also extract useful work from the engine, the present system and method as described herein can generate more than about 30% by volume combined concentration of hydrogen and carbon monoxide exhaust based on total volume of exhaust. Further, greater than about 50% by volume combined concentration of hydrogen and carbon monoxide exhaust based on total volume of exhaust is achieved with the present system and method, particularly when hydrogen enrichment is effected with the rich turbo-generator system. Further, when the present hydrogen rich exhaust configurations are combined with the present oxygen enrichment configurations, combined hydrogen and carbon monoxide concentrations of greater than about 70% by volume based on total concentration of exhaust, depending on the fuel used.

From the engine, the hydrogen rich engine exhaust 50 is directed into the fuel side of a SOFC. An air stream 50 is directed to the air side 44 of the SOFC where oxygen in the air ionizes to $O^{-2}$, producing electricity. The electricity is directed from the SOFC via an electric line (shown as dotted line in FIG. 1) to an electrical source 100 such as a battery, capacitor, motor/generator, combination thereof, and/or other device, while the oxygen ions migrate across the ceramic electrolyte to the fuel side 42 where they react to form mostly water and carbon dioxide.

The SOFC effluent 70 and/or the oxygen depleted air 75 can optionally pass through a turbine (not shown) which recovers energy from SOFC effluent 70 and/or oxygen depleted air 75. The SOFC effluent 70 and, optionally, the oxygen depleted air 75 then preferably pass through a catalytic converter 90 prior to entering a heat exchanger 57. Within the heat exchanger 57, the SOFC effluent 70 and oxygen depleted air 75 are cooled, typically to temperatures below about 100° C. while heating the fuel and air to temperatures typically exceeding about 300° C. The exhaust stream 121 from the heat exchanger 57 can then be vented to the environment (not shown).

As stated above, the air entering the system may be compressed prior to introduction into the SOFC, however, the compressor is not essential since the engine itself can act as a pump, enabling elimination of the compressor. The compressor, however, allows increased power output. The particular type of compressor employed in the system is dependent upon the particular application. For example, a conventional compressor capable of compressing to moderate pressures (up to about 3 atmospheres) is typically employed in turbocharged engines, with the pressure employed controlled to configure the power output and efficiency of the SOFC and the engine as a system. For uses within a vehicle, the pressure can be up to or exceeding about 2 atmospheres (absolute pressure), with about 1 to about 2 atmospheres (absolute pressure) preferred. Possible compressors include, but are not limited to, mechanical devices driven, for example, by direct connection to the exhaust turbine or by a mechanical supercharger, or can be configured independently via electricity or hydraulics.

The SOFC 40 employed with the present invention can be any conventional SOFC capable of ionizing and conducting oxygen. The SOFC comprises an electrolyte having catalyst disposed on both the fuel and air side of the electrolyte.

Possible catalysts include those capable of ionizing oxygen and reacting the ionized oxygen with conventional fuels, including, but not limited to, noble metal-based catalysts and alloys thereof, among others. It is envisioned that multiple SOFCs can be employed, in series or in parallel on the exhaust side of the engine. Optionally, additional SOFCs may be employed on the induction side of the engine.

Within the SOFC 40, the ionization of the oxygen produces electricity (shown as dotted lines) which can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. Unlike conventional motor vehicles, the electricity produced by the SOFC 40 is direct current which can be matched to the normal system voltage of the vehicle, thereby minimizing the requirements for devices such as diodes, voltage conversion and other losses, such as resistive losses in the wiring and in/out of the battery, associated with conventional vehicle systems and traditional hybrid electrical systems. This high efficiency electricity allows efficient electrification of the vehicle, including functions such as air conditioning and others, allowing weight, fuel economy and performance advantages compared to conventional hybrid electric mechanization and conventional internal combustion engine systems.

During start-up and for cabin heating, the SOFC 40 can be configured at high adiabatic temperatures, e.g. up to about 1,000° C., subject to catalyst limitations, with typical operating temperatures ranging from about 600° C. to about 900° C., and preferably about 650° C to about 800° C. Consequently, at least one heat exchanger 57 is preferably employed to cool the SOFC effluent 70 and conversely heat the air 59 prior to entering the SOFC 40, with conventional heat exchangers generally employed.

The engine fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, Fischer Tropsch, dimethyl ether, and others, and combinations thereof. The preferred fuel is typically based upon the type of engine employed, with lighter fuels, i.e. those which can be more readily vaporized and/or conventional fuels which are readily available to consumers, generally preferred.

The other major component beside the SOFC 40 which is typically employed by the system of the present invention to produce tractive power for a vehicle is the engine 30. Within the engine 30, air 63, reformate 21, and/or other fuel 11 are burned to produce shaft power, while the hydrogen rich engine exhaust 50 or reformer exhaust 20 is used as fuel in the SOFC 40. The engine 30 can be any conventional combustion engine configured to produce hydrogen rich engine exhaust to feed a SOFC 40 including, but not limited to, internal combustion engines such as gas turbine, spark ignited and compression ignited engines, including, but not limited to, variable compression engines. Preferably, the engine has been modified to include one or a combination of rich combustion devices, including, but not limited to, free piston gas generators with super rich HCCI combustion, oxygen separators with rich IC cylinder systems having enhanced rich combustion in all or part of the engine and, optionally, HCCI, and extremely rich, preheated inlet turbo-generator systems having a one- or two-stage combustion system. Preferably, the system has been modified to include one or a combination of oxygen separator devices including, but not limited to pressure swing absorption devices, SOFC oxygen separators, and ceramic membranes.

The SOFC effluent 70 preferably enters a catalytic converter 90 in order to attain extremely low, nearly zero emissions of hydrocarbons and nitric oxide. The catalytic converter 90 is typical of those used in automotive applications, including those employing (1) noble metals and alloys thereof, such as platinum, rhodium and palladium catalysts and alloys thereof, among others and/or (2) particulate filtering and destruction.

Optional equipment which additionally may be employed with the present system includes, but is not limited to, sensors and actuators, heat exchangers, a battery, fuel reformer, burner, phase change material, thermal storage system, plasmatron, a desulfurizer, or combination thereof Where the desulfurizer may be employed if the fuel is rich in sulfur, or if the catalyst employed in the SOFC is particularly intolerant to sulfur, such as nickel-based catalysts, among other conventional equipment. In contrast to conventional vehicles and even to prior art systems that employ fuel cells, the system of the present invention does not require the use of a battery, although a small battery is preferably employed as peaking device for high power modes. The engine may act as a peaking device for high power modes (analogous to a battery).

The various embodiments of the present invention provide advantages over the prior art in that they: (1) provide hydrogen and carbon monoxide rich exhaust; (2) further increase the hydrogen yield in the exhaust by application of oxygen enrichment concepts; (3) provide a smaller SOFC than earlier concepts. In particular, the present hybrid electric powertrain configuration utilizes a very small SOFC and is suitable for use with a light, urban, SULEV (super ultra low emission vehicle) which is highly energy efficient; (4) minimize waste by using both oxygen enriched streams and oxygen depleted streams to run, respectively, both rich cylinders and dilute cylinders; (5) nearly zero emissions due to the ability to combust extremely dilute mixtures on the cold start and to consume unburned and partially burned fuel which is always produced in combustion (especially rich combustion), e.g. intended to meet or exceed SULEV standards of 0.010 grams per mile (g/mi) hydrocarbons, 1.0 g/mi carbon monoxide, 0.02 g/mi nitric oxide, and 0.01 g/mi particulate; (6) increase overall system efficiency, up to or exceeding about 60% at light load and about 45% at heavy load; and (7) are compatible with advanced combustion systems such as homogeneous charge compression ignition—a "clean" diesel technology where premixed fuel is ignited by compression pressure and temperature; (8) allow combustion of fuels with extremely low particulate emissions by trapping and consuming particulate in the SOFC and catalytic converters; (9) provide additional reliability from two independent "engines," that is, the IC engine and the SOFC; (10) eliminates period of delay before vehicle may be driven with close to full power; and (11) provides plug-in SOFC operation that can power home, office, work site, etc., with a source of distributed, high efficiency electric power and heat.

The embodiments of the present system and method, although mostly described in relation to utilization within a vehicle, can be utilized in numerous applications, including, but not limited to: cogeneration of heat and electric power, distributed electric power generation, such as small scale power plants for commercial/industrial/marine applications, and portable power generation, such as military/construction/recreational applications, among others.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A power generation system comprising:
   (a) an engine having an intake and an exhaust, wherein said engine is configured to produce a hydrogen rich engine exhaust;
   (b) an air supply in fluid communication with said engine intake;
   (c) a fuel supply in fluid communication with said engine intake;
   (d) at least one SOFC having an air intake in fluid communication with an air supply, a fuel intake in fluid communication with said hyrdrogen rich engine exhaust, a SOFC effluent and an air effluent.

2. The power generation system as in claim 1, wherein said engine is configured to produce a hydrogen rich exhaust having a combined concentration of hydrogen and carbon monoxide greater than about 30% by volume.

3. The power generation system as in claim 1, wherein said system is configured to produce a hydrogen rich exhaust having a combined concentration of hydrogen and carbon monoxide greater than about 50% by volume.

4. The power generation system as in claim 1, further comprising:
   at least one water shift device having an intake in fluid communication with said hydrogen rich engine exhaust and an effluent in fluid communication with said SOFC fuel intake.

5. The power generation system as in claim 1, wherein said engine comprises a free piston gas generator.

6. The power generation system as in claim 5, further comprising a rich homogenous charge compression ignition.

7. The power generation system as in claim 1, wherein said engine further comprises an oxygen separator, a rich internal combustion engine cylinder system in at least part of said engine, a rich homogenous charge compression ignition, an optional dilute cylinder system in part of said engine, and combinations thereof.

8. The power generation system as in claim 1, wherein said engine comprises a turbo-generator system.

9. The power generation system as in claim 8, wherein said turbo-generator system is selected from the group consisting of a turbo-generator system having a two stage combustor and a turbo-generator system having a single stage combustor.

10. The power generation system as in claim 1, further comprising:
    an oxygen separator having an oxygen stream effluent in fluid communication with said engine intake.

11. The power generation system as in claim 10, wherein said system is configured to produce a hydrogen rich exhaust having a combined concentration of hydrogen and carbon monoxide greater than about 70% by volume.

12. The power generation system as in claim 10, wherein said oxygen separator is selected from the group consisting of pressure swing absorption oxygen separators, SOFC oxygen separators, ceramic membrane oxygen separators, and combinations thereof.

13. The power generation system as in claim 7, further comprising:
    an oxygen separator having an oxygen stream effluent in fluid communication with said engine intake.

14. The power generation system as in claim 13, wherein said oxygen separator is selected from the group consisting of pressure swing absorption oxygen separators, SOFC oxygen separators, ceramic membrane oxygen separators, and combinations thereof.

15. The power generation system as in claim 1, further comprising a turbine in fluid communication with said SOFC effluent.

16. The power generation system as in claim 15, wherein said turbine is further in fluid communication with said air effluent.

17. The power generation system as in claim 1, wherein said SOFC fuel intake is further in fluid communication with said fuel supply.

18. The power generation system as in claim 17, wherein said SOFC fuel intake is further in fluid communication with said air supply.

19. The power generation system as in claim 1, further comprising at least one compressor in fluid communication with said air supply and said SOFC.

20. The power generation system as in claim 1, further comprising a fast start-up reformer having an intake in fluid communication with a fuel supply and an effluent in fluid communication with said SOFC fuel intake.

21. The power generation system as in claim 20, wherein said fast start-up reformer is selected from the group consisting of a burner, heat exchanger, plasmatron, vaporizer, fuel reformer, catalytic reformer, rich burner and combinations thereof.

22. The power generation system as in claim 1, further comprising a catalytic converter having an inlet, wherein said inlet is in fluid communication with said SOFC effluent.

23. The power generation system as in claim 1, further comprising at least one heat exchanger having an intake in fluid communication with said engine exhaust and an air effluent in fluid communication with said SOFC air intake.

24. The power generation system as in claim 1, further comprising:
    said SOFC fuel intake further in fluid communication with an alternate fuel supply, said hydrogen rich engine exhaust, or a combination thereof; wherein
    electricity produced by said SOFC operates a base load of electrical accessories, provides traction power, recharges electrical sources, or a combination thereof, while said engine provides limited traction power.

25. The power generation system as in claim 1, further comprising:
    said SOFC fuel intake further in fluid communication with an alternate fuel supply, said hydrogen rich engine exhaust, or a combination thereof; wherein
    electricity produced by said SOFC supplies all of a vehicle's traction power, operates electrical accessories, or a combination thereof.

26. The power generation system as in claim 1, further comprising:
    said SOFC fuel intake further in fluid communication with an alternate fuel supply, said hydrogen rich engine exhaust, or a combination thereof;
    said engine operating at less than full capacity or shut down; and wherein;
    a high power mode for providing high traction power, high accessory power, or a combination thereof, is provided using electricity produced by said SOFC in combination with a fast start-up reformer, using electricity produced by said SOFC in combination with turning on said engine for short cycles of operation, using electricity produced by said SOFC in combination with a battery, or a combination thereof.

27. A power generation system comprising:
(a) a rich homogenous charge compression ignition free piston engine having an intake and an exhaust, wherein said engine is configured to produce a hydrogen rich engine exhaust;
(b) an air supply in fluid communication with said engine intake;
(c) a fuel supply in fluid communication with said engine intake;
(d) at least one SOFC having an air intake in fluid communication with an air supply, a fuel intake in fluid communication with said hydrogen rich engine exhaust, a SOFC effluent and an air effluent.

28. The power generation system as in claim 27, further comprising:
an oxygen enrichment device having an oxygen stream effluent in fluid communication with said engine intake for providing oxygen enriched air to said engine.

29. The power generation system as in claim 27, further comprising:
an oxygen enrichment device having an oxygen stream effluent in fluid communication with said engine intake for providing oxygen enriched air to said engine;
wherein said oxygen enrichment device is an oxygen separator, a pressure swing absorption oxygen separator, a SOFC oxygen separator, a ceramic membrane oxygen separator, or a combination thereof.

30. The power generation system as in claim 27, further comprising:
at least one water shift device having an intake in fluid communication with said hydrogen rich engine exhaust and an effluent in fluid communication with said SOFC fuel intake.

31. The power generation system as in claim 27 wherein said SOFC fuel intake is further in fluid communication with said fuel supply.

32. The power generation system as in claim 27, wherein said SOFC fuel intake is further in fluid communication with said air supply.

33. The power generation system as in claim 27, further comprising at least one compressor in fluid communication with said air supply and said SOFC.

34. The power generation system as in claim 27, further comprising a fast start-up reformer having an intake in fluid communication with a fuel supply and an effluent in fluid communication with said SOFC fuel intake.

35. The power generation system as in claim 34, wherein said fast start-up reformer is selected from the group consisting of a burner, heat exchanger, plasmatron, vaporizer, fuel reformer, catalytic reformer, rich burner, and combinations thereof.

36. The power generation system as in claim 27, further comprising a catalytic converter having an inlet, wherein said inlet is in fluid communication with said SOFC effluent.

37. The power generation system as in claim 27, further comprising at least one heat exchanger having an intake in fluid communication with said engine exhaust and an air effluent in fluid communication with said SOFC air intake.

38. A power generation system comprising:
(a) a rich internal combustion engine having an intake and an exhaust, wherein said engine is configured to produce a hydrogen rich engine exhaust;
(b) an air supply in fluid communication with said engine intake;
(c) a fuel supply in fluid communication with said engine intake;
(d) at least one SOFC having an air intake in fluid communication with an air supply, a fuel intake in fluid communication with said hydrogen rich engine exhaust, a SOFC effluent and an air effluent.

39. The power generation system as in claim 38, further comprising:
a homogenous charge compression ignition.

40. The power generation system as in claim 38, further comprising:
an oxygen enrichment device having an oxygen stream effluent in fluid communication with said engine intake for providing oxygen enriched air to said engine.

41. The power generation system as in claim 38, further comprising:
an oxygen enrichment device having an oxygen stream effluent in fluid communication with said engine intake for providing oxygen enriched air to said engine;
wherein said oxygen enrichment device is an oxygen separator, a pressure swing absorption oxygen separator, a SOFC oxygen separator, a ceramic membrane oxygen separator, or a combination thereof.

42. The power generation system as in claim 38, further comprising:
at least one water shift device having an intake in fluid communication with said hydrogen rich engine exhaust and an effluent in fluid communication with said SOFC fuel intake.

43. The power generation system as in claim 38, wherein said engine comprises a dilute cylinder system in part of said engine.

44. The power generation system as in claim 38, wherein said SOFC fuel intake is further in fluid communication with said fuel supply.

45. The power generation system as in claim 38, wherein said SOFC fuel intake is further in fluid communication with said air supply.

46. The power generation system as in claim 38, further comprising at least one compressor in fluid communication with said air supply and said SOFC.

47. The power generation system as in claim 38, further comprising a fast start-up reformer having an intake in fluid communication with a fuel supply and an effluent in fluid communication with said SOFC fuel intake.

48. The power generation system as in claim 47, wherein said fast start-up reformer is selected from the group consisting of a burner, heat exchanger, plasmatron, vaporizer, fuel reformer, catalytic reformer, rich burner, and combinations thereof.

49. The power generation system as in claim 38, further comprising a catalytic converter having an inlet, wherein said inlet is in fluid communication with said SOFC effluent.

50. The power generation system as in claim 38, further comprising at least one heat exchanger having an intake in fluid communication with said engine exhaust and an air effluent in fluid communication with said SOFC air intake.

51. A power generation system comprising:
(a) a spark ignition internal combustion engine having an intake and an exhaust, and an oxygen enrichment device having an oxygen stream effluent in fluid communication with said engine intake for providing oxygen enriched air to said engine, wherein said engine is configured to produce a hydrogen rich engine exhaust;
(b) an air supply in fluid communication with said engine intake;

(c) a fuel supply in fluid communication with said engine intake;

(d) at least one SOFC having an air intake in fluid communication with an air supply, a fuel intake in fluid communication with said hydrogen rich engine exhaust, a SOFC effluent and an air effluent.

52. The power generation system as in claim 51, wherein said oxygen enrichment device is an oxygen separator, a pressure swing absorption oxygen separator, a SOFC oxygen separator, a ceramic membrane oxygen separator, or a combination thereof.

53. The power generation system as in claim 51, further comprising:

at least one water shift device having an intake in fluid communication with said hydrogen rich engine exhaust and an effluent in fluid communication with said SOFC fuel intake.

54. The power generation system as in claim 51, wherein said SOFC fuel intake is further in fluid communication with said fuel supply.

55. The power generation system as in claim 51, wherein said SOFC fuel intake is further in fluid communication with said air supply.

56. The power generation system as in claim 51, further comprising at least one compressor in fluid communication with said air supply and said SOFC.

57. The power generation system as in claim 51, further comprising a fast start-up reformer having an intake in fluid communication with a fuel supply and an effluent in fluid communication with said SOFC fuel intake.

58. The power generation system as in claim 51, wherein said fast start-up reformer is selected from the group consisting of a burner, heat exchanger, plasmatron, vaporizer, fuel reformer, catalytic reformer, rich burner, and combinations thereof.

59. The power generation system as in claim 51, further comprising a catalytic converter having an inlet, wherein said inlet is in fluid communication with said SOFC effluent.

60. The power generation system as in claim 51, further comprising at least one heat exchanger having an intake in fluid communication with said engine exhaust and an air effluent in fluid communication with said SOFC air intake.

61. A power generation system comprising:

(a) a compression ignition internal combustion engine having an intake and an exhaust, and an oxygen enrichment device having an oxygen stream effluent in fluid communication with said engine intake for providing oxygen enriched air to said engine, wherein said engine is configured to produce a hydrogen rich engine exhaust;

(b) an air supply in fluid communication with said engine intake;

(c) a fuel supply in fluid communication with said engine intake;

(d) at least one SOFC having an air intake in fluid communication with an air supply, a fuel intake in fluid communication with said hydrogen rich engine exhaust, a SOFC effluent and an air effluent.

62. The power generation system as in claim 61, wherein said oxygen enrichment device is an oxygen separator, a pressure swing absorption oxygen separator, a SOFC oxygen separator, a ceramic membrane oxygen separator, or a combination thereof.

63. The power generation system as in claim 61, further comprising:

at least one water shift device having an intake in fluid communication with said hydrogen rich engine exhaust and an effluent in fluid communication with said SOFC fuel intake.

64. The power generation system as in claim 61, wherein said SOFC fuel intake is further in fluid communication with said fuel supply.

65. The power generation system as in claim 61, wherein said SOFC fuel intake is further in fluid communication with said air supply.

66. The power generation system as in claim 61, further comprising at least one compressor in fluid communication with said air supply and said SOFC.

67. The power generation system as in claim 61, further comprising a fast start-up reformer having an intake in fluid communication with a fuel supply and an effluent in fluid communication with said SOFC fuel intake.

68. The power generation system as in claim 61, wherein said fast start-up reformer is selected from the group consisting of a burner, heat exchanger, plasmatron, vaporizer, fuel reformer, catalytic reformer, rich burner, and combinations thereof.

69. The power generation system as in claim 61, further comprising a catalytic converter having an inlet, wherein said inlet is in fluid communication with said SOFC effluent.

70. The power generation system as in claim 61, further comprising at least one heat exchanger having an intake in fluid communication with said engine exhaust and an air effluent in fluid communication with said SOFC air intake.

71. A power generation system comprising:

(a) a rich combustor turbo-generator system having an intake and an exhaust, wherein said rich combustor turbo-generator system is configured to produce a hydrogen rich engine exhaust;

(b) an air supply in fluid communication with said engine intake;

(c) a fuel supply in fluid communication with said engine intake;

(d) at least one SOFC having an air intake in fluid communication with an air supply, a fuel intake in fluid communication with said hydrogen rich engine exhaust, a SOFC effluent and an air effluent.

72. The power generation system of claim 71, wherein said rich combustor turbo-generator system is selected from the group consisting of a turbo-generator system having a two stage combustor and a turbo-generator system having a single stage combustor.

73. The power generation system as in claim 71, further comprising:

an oxygen enrichment device having an oxygen stream effluent in fluid communication with said engine intake for providing oxygen enriched air to said engine.

74. The power generation system of claim 73, wherein said oxygen enrichment device is an oxygen separator, a pressure swing absorption oxygen separator, a SOFC oxygen separator, a ceramic membrane oxygen separator, or a combination thereof.

75. The power generation system as in claim 71, further comprising:

at least one water shift device having an intake in fluid communication with said hydrogen rich engine exhaust and an effluent in fluid communication with said SOFC fuel intake.

76. The power generation system as in claim 71, wherein said SOFC fuel intake is further in fluid communication with said fuel supply.

77. The power generation system as in claim 71, wherein said SOFC fuel intake is further in fluid communication with said air supply.

78. The power generation system as in claim 71, further comprising at least one compressor in fluid communication with said air supply and said SOFC.

79. The power generation system as in claim 71, further comprising a fast start-up reformer having an intake in fluid communication with a fuel supply and an effluent in fluid communication with said SOFC fuel intake.

80. The power generation system as in claim 71, wherein said fast start-up reformer is selected from the group consisting of a burner, heat exchanger, plasmatron, vaporizer, fuel reformer, catalytic reformer, rich burner, and combinations thereof.

81. The power generation system as in claim 71, further comprising a catalytic converter having an inlet, wherein said inlet is in fluid communication with said SOFC effluent.

82. The power generation system as in claim 71, further comprising at least one heat exchanger having an intake in fluid communication with said engine exhaust and an air effluent in fluid communication with said SOFC air intake.

83. A power generation system comprising:
   (a) a engine having an intake and an exhaust, wherein said engine is configured to run in an extended rich mode to produce a substantially continuous hydrogen rich engine exhaust;
   (b) an air supply in fluid communication with said engine intake;
   (c) a fuel supply in fluid communication with said engine intake;
   (d) at least one energy conversion device having an air intake in fluid communication with an air supply, a fuel intake in fluid communication with said hydrogen rich engine exhaust, a fuel effluent and an air effluent.

84. The power generation system as in claim 83, further comprising:
   an oxygen enrichment device having an oxygen stream effluent in fluid communication with said engine intake for providing oxygen enriched air to said engine.

85. The power generation system as in claim 83, further comprising:
   an oxygen enrichment device having an oxygen stream effluent in fluid communication with said engine intake for providing oxygen enriched air to said engine;
   wherein said oxygen enrichment device is an oxygen separator, a pressure swing absorption oxygen separator, a SOFC oxygen separator, a ceramic membrane oxygen separator, or a combination thereof.

86. The power generation system as in claim 83, further comprising:
   at least one water shift device having an intake in fluid communication with said hydrogen rich engine exhaust and an effluent in fluid communication with said energy conversion device fuel intake.

87. The power generation system as in claim 83, wherein said energy conversion device fuel intake is further in fluid communication with said fuel supply.

88. The power generation system as in claim 83, wherein said energy conversion device fuel intake is further in fluid communication with said air supply.

89. The power generation system as in claim 83, further comprising at least one compressor in fluid communication with said air supply and said energy conversion device.

90. The power generation system as in claim 83, further comprising a fast start-up reformer having an intake in fluid communication with a fuel supply and an effluent in fluid communication with said energy conversion device fuel intake.

91. The power generation system as in claim 90, wherein said fast start-up reformer is selected from the group consisting of a burner, heat exchanger, plasmatron, vaporizer, fuel reformer, catalytic reformer, rich burner, and combinations thereof.

92. The power generation system as in claim 83, further comprising a catalytic converter having an inlet, wherein said inlet is in fluid communication with said energy conversion device fuel effluent.

93. The power generation system as in claim 83, further comprising at least one heat exchanger having an intake in fluid communication with said engine exhaust and an air effluent in fluid communication with said energy conversion device air intake.

94. The power generation system as in claim 83, wherein said engine is a rich homogenous charge compression ignition engine, a rich internal combustion engine, a spark ignition internal combustion engine having an oxygen enrichment device, a compression ignition internal combustion engine having an oxygen enrichment device, or a rich combustor turbogenerator system having an optional oxygen enrichment device and a combustor selected from a two stage combustor or single stage combustor.

95. The power generation system as in claim 83, wherein said energy conversion device is a fuel cell, a SOFC, a gas turbine, a spark ignited engine, a compression ignited engine, or a combination thereof.

* * * * *